United States Patent [19]

Genson

[11] 3,769,131
[45] Oct. 30, 1973

[54] APPARATUS AND METHOD FOR LAMINATING FLEXIBLE LAYERS
[75] Inventor: Samuel Richard Genson, Weston, Ohio
[73] Assignee: Johns-Manville Corporation, New York, N.Y.
[22] Filed: May 3, 1971
[21] Appl. No.: 139,423

[52] U.S. Cl.............. 156/283, 156/320, 156/324, 156/498, 156/549, 156/555, 161/88
[51] Int. Cl............................................. B32b 31/12
[58] Field of Search................ 156/324, 322, 320, 156/283, 543, 547, 498, 499, 549, 555

[56] References Cited
UNITED STATES PATENTS
2,972,369  2/1961   Jensen ............................ 156/324 X
2,954,069  9/1960   Lithio ................................. 156/498
3,232,813  2/1966   Newton........................... 156/322 X
2,831,794  4/1958   Elmendorf....................... 156/320 X
2,953,187  9/1960   Francis ............................ 156/498 X
2,728,703  12/1955  Kiernan et al. ..................... 156/320
2,817,618  12/1957  Hahn .............................. 156/320 X Primary Examiner—Charles E. Van Horn
Attorney—John A. McKinney, Robert M. Krone, Joseph J. Kelly and Ronald M. Halvorsen

[57] ABSTRACT

A method and apparatus for laminating two layers of material wherein one of the layers of material is relatively frangible. The layers are bonded together by a heat sensitive binder which must be cooled to assure product integrity. The laminated product is conveyed through a cooling zone with the frangible layer in a protected position against an associated conveyor to militate against attrition of the frangible material.

5 Claims, 5 Drawing Figures

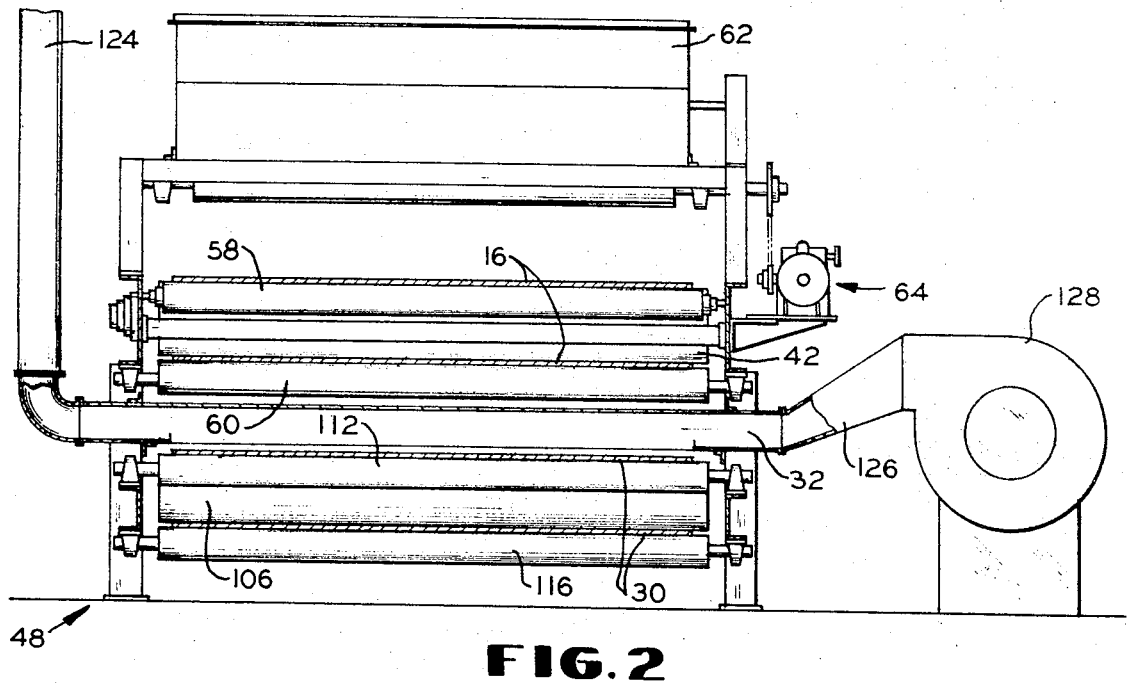
FIG. 2
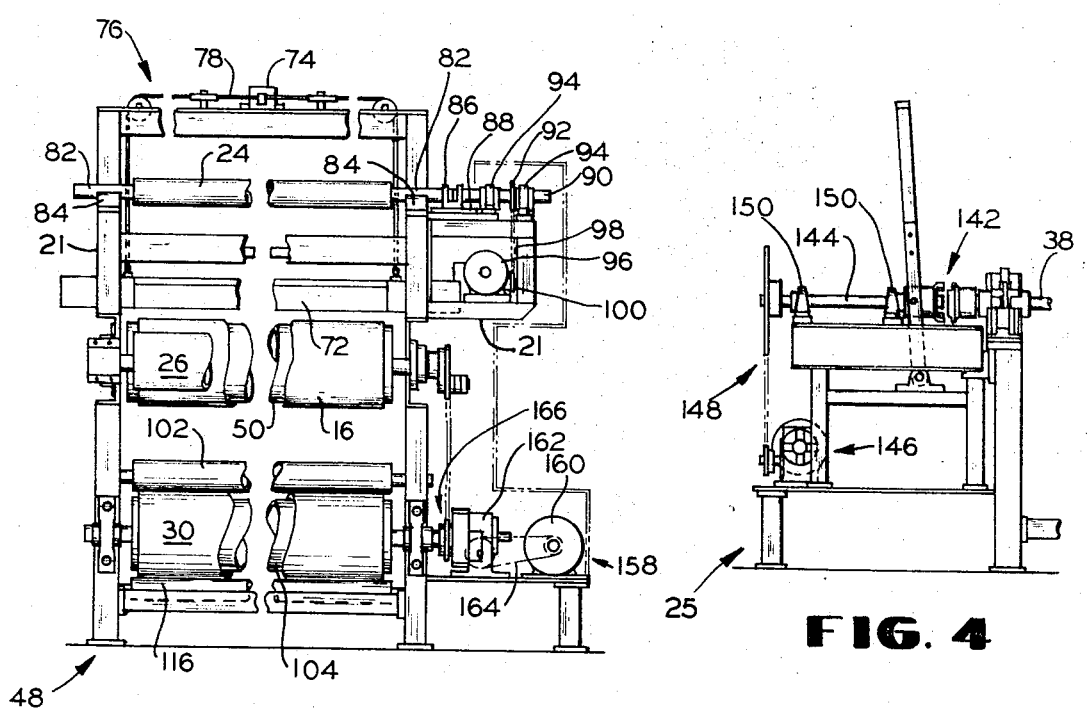
FIG. 3
FIG. 4
INVENTOR
SAMUEL RICHARD GENSON
BY Robert M. Ksone
ATTORNEY

APPARATUS AND METHOD FOR LAMINATING FLEXIBLE LAYERS

BACKGROUND OF THE INVENTION

Glass reinforced plastic products such as boats and automobile bodies make use of both woven glass roving and chopped strand glass mat in their construction. Such reinforced plastic products are produced by a series of woven roving layers and chopped strand mat layers, each of which is cut to shape, by laying layers of each in a mold with each layer wetted with plastic resin.

The above process is a time consuming one involving manual labor. A product consisting of a single laminae of chopped strand mat bonded to woven roving can be used in the process of building up a body to reduce the process time and labor required.

To produce a laminated mat which is compatible with a process for building up layers of chopped strand mat and woven roving as in molding plastic bodies, the binder for the laminated mat must be compatible with the plastic to be reinforced as well as the binder for the chopped strand mat. Preferably, the binder for the lamination of the mats is the same as that for the chopped strand mat so that when the binder is thermoplastic and heating occurs, during the lamination process there is a tendency to release the previous bond. The weakened bond permits movement of the strands within the chopped strand mat resulting in dimensional instability of the chopped strand mat and permits attrition of individual strands.

The present method and apparatus overcome the above problems in the formation of laminated mats by providing protection and support for the chopped strand mat when it is in a heated condition and during cooling of the laminate to maintain dimensional stability and contain its temporarily freed individual strands.

SUMMARY

The present method and apparatus relate to joining layers of material to form laminated structures and more particularly to joining a layer of woven roving to a layer of chopped strand mat. Means for forming a laminated structure of at least two layers is illustrated in one embodiment of the invention as apparatus for advancing lengths of woven roving and chopped strand mat along a path, as on a conveyor belt coordinated with a press roll acting against the conveyor belt wherein the woven roving is joined to the chopped strand mat. The chopped strand mat and woven roving are pressed together by the press roll while an adhesive previously applied to the woven roving is in a tackey state to insure a thorough and uniform bond between the laminae. A mandrel with lateral adjustment is employed to mate a major surface of each of the woven roving and the chopped strand mat as a means for aligning the longitudinal edges of the layers. Subsequent to joining the woven roving to the chopped strand mat to form a laminate of woven roving and chopped strand mat, the laminate is inverted and advanced on a conveyor underlying and contacting the chopped strand mat portion with the woven roving portion above the mat exposed. A curing station in the form of means for cooling the exposed woven roving and laminate prior to coiling the laminate is provided to withdraw the heat energy from the laminate and freeze the adhesive.

Associated equipment includes a rewind mandrel to coil the laminate of woven roving and chopped strand mat, and binder application and heater stations in advance of the press roll to coat the woven roving with binder and heat the binder to a tackey state, respectively.

Where it is desirable to slit the laminate of woven roving and chopped strand mat, an edge guiding station and slitter station can be incorporated in advance of the rewind mandrel to slit the laminated mat to desired widths.

The above apparatus and method provide a means for joining woven roving with chopped strand mat to maintain the dimensional stability of materials while reducing attrition of chopped strand due to handling. Attrition is especially reduced where the laminate is slit because the laminate with binder has more stability than either of the lamina standing on their own.

BRIEF DESCRIPTION OF THE DRAWINGS

FIG. 2 is a sectional view of the apparatus in FIG. 1 taken along line 4—4 thereof including an exhaust system for a cooling station;

FIG. 3 is a fragmentary left-hand end view of the apparatus in FIG. 1;

FIG. 4 is a partial right-hand view of the apparatus in FIG. 1; and

DESCRIPTION OF THE PREFERRED EMBODIMENT

Figure 1:
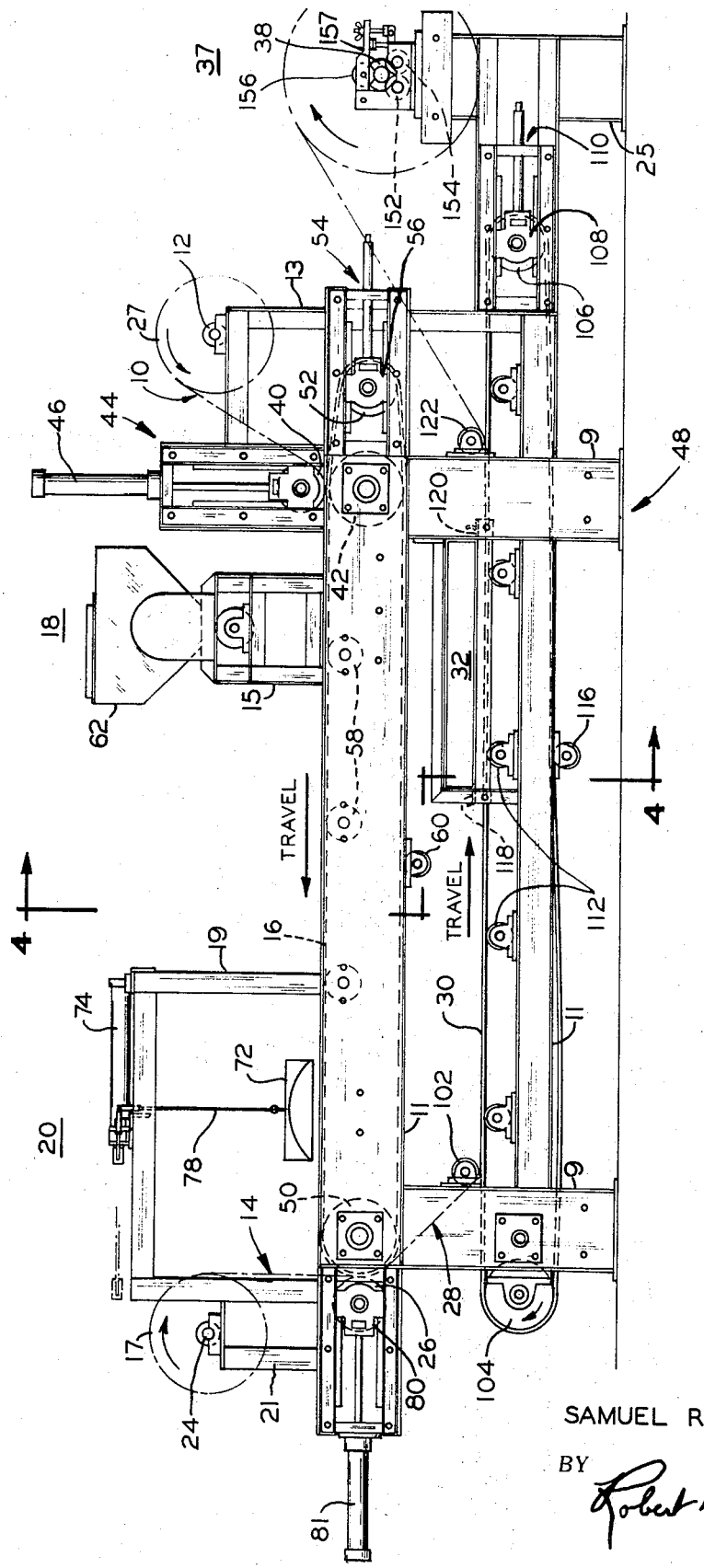
FIG. 1 is a longitudinal elevational view of apparatus for producing a laminate in accordance with the invention with certain elements removed to clarify the disclosure.

Both woven roving and chopped strand mat are manufactured from a roving. A roving is formed by adhering together with sizing material a number of strands known as ends which consist of a large number of individual glass fibers also adhered together by sizing material. While the woven roving is formed on a loom by weaving rovings, the chopped strand mat is a uniform layer of non-woven, random oriented fibers which are chopped to short lengths and uniformly distributed and bonded into a mat. The binder for the mat of chopped strand must be compatible with the resin of the body it is to reinforce, such as polyester resin. When a laminate of woven roving and chopped strand mat is formed by bonding the two together, the same binder which is used to bond the chopped strand mat is again used to bond it to the woven roving. Thus, there is compatability between the binder for the chopped strand mat, the binder for the laminate and the plastic resin used for molding reinforced resin panels.

Thermoplastic binders for the laminate require special manipulations of the laminate during its production since previously bonded binder tends to soften when heat is utilized to make the laminating binder tacky. According to this invention the binder is heated to a tacky state and applied to the more stable of the webs to be laminated, the woven web in the example. Heat is introduced into this web and should be removed therefrom expeditiously following the engagement of the second web to the first. Since the greater amount of heat in the laminate web is in that web to which the adhesive was first applied, that first web is maintained in heat transfer relationship with a cooling medium at a cooling station.

Binder is applied to the first web in a non-tacky granular form distributed over an upper surface of the web. It is made tacky by passing through a heating station which incidently also heats the web. In the apparatus illustrated, the second web is laid down on the upper surface of the first web, pressed against the first web to increase the contact of the tacky adhesive with the first web, with the strands of the second web and with the previously hardened binder of the second web. Thus, heat is transferred to that previously hardened binder and tends to soften it.

In order to minimize the effect of any dimensional instability in the second web as might be due to its softened binder, immediately following the engagement of the second web with the first web the laminate external support is transferred from the first web to the second web and the first web is exposed to a cooling medium. An endless conveyor surface is engaged with the exposed surface of the second web. One means of support is to invert the laminate so that the second web underlies the first and is sandwiched between the first and the conveyor surface. Another means is to impose a differential gas pressure on the first web opposite a conveyor surface engaging the second web as by locating the conveyor surface above the upper face of the laminate and against the up facing second web.

While the preferred method of protecting the chopped strand mat of the second web and cooling the first web is to turn the laminate back upon itself and lay it on a conveyor over which a cooling stream of gas flows, it is to be understood that the laminate can be turned longitudinally at right side over left side to lay the chopped strand on a conveyor surface or the mating of the laminae can be accomplished by inverting the adhesive coated web and then engaging its coated surface with an underlying second web.

The binder employed in the chopped strand mat and in the laminate in the illustrative embodiment is propoxylated bisphenol A fumarate polyester resin. It has the characteristics of a thermoplastic in the range of usage and, when the laminate is employed in the reinforcement of polyester resin bodies, it is soluble in the liquid resin to which it is exposed during the molding or lay-up of the body.

The resin binder used to bond chopped strand mat to woven roving is applied to the face of the woven roving in powder form and heated to soften it to a tacky state. Since the binder is heated on the woven roving, heat is applied to and absorbed by both. To cure the binder, the heat must be removed both from it and the woven roving. Removal of the heat is facilitated by exposing the woven roving to cooling air. When cooling air is applied to the laminate, care must be taken to prevent loss of chopped strands which may have become loosened by the heat subsequent to laminating. The present apparatus exposes the woven roving to cooling by inverting the woven roving subsequent to the step of laminating. Further, the laminate is supported on the chopped strand mat surface side, generally, immediately after leaving the bonding area by a return conveyor belt. The return conveyor belt encloses the chopped strand mat between the woven roving and the belt and maintains the dimensional stability of the laminate until the binder is cooled sufficiently to solidify.

The support provided by the mat laminate militates against the lateral and longitudinal movement of strands within the chopped strand mat as well as the woven roving. Tension on the chopped strand mat, woven roving and laminate can be minimized by coordinating conveyor belt speed with web feed speed thereby further enhancing dimensional stability of the laminate.

The apparatus is not limited with respect to the number of layers of material which could be used on the line since it would be simply a matter of adding mandrels and suitable binder stations for additional layers. Also, the present apparatus could use combinations of single and laminated layers or a series of laminated layers. Fibrous materials other than glass can be employed in the composition of one or more of the webs.

Figure 5:
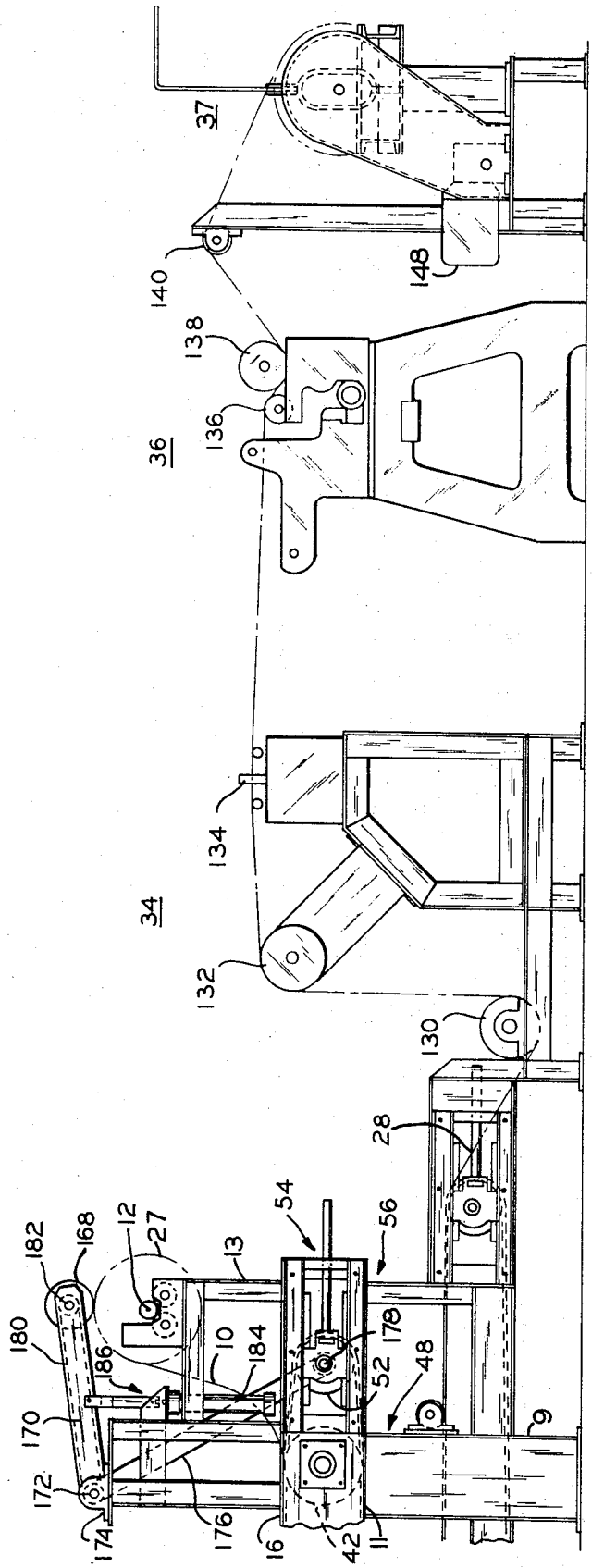
FIG. 5 is a fragmentary elevational view illustrating an alternative embodiment of the apparatus illustrated in FIG. 1.

One form of apparatus for laminating two webs is shown in FIG. 1 mounted upon a main frame work 48 comprising legs 9 interconnected by beams 11. Subsidiary frames 13, 15, 19 and 21 support a source of a first web 10, a binder applicator 18, a binder activator 20 and a source of a second web 14 respectively. The finished laminate is collected to a winder 37 mounted on a frame 25 or, as will be discussed, it can be carried through a guide station 34 to a slitter 36 and a winder 37 which can be physically independent of the laminating apparatus as shown in FIG. 5.

The first web will be discussed as a woven glass fiber roving which is supported as a coil 27 on mandrel 12, and is drawn off the coil as at 10 by the primary conveyor belt 16 upon which it is held by the weight of feed roll 40. The woven roving 10 is unwound and fed onto the primary conveyor belt 16 advanced past a binder station 18 and a heating station 20. At the binder station, a powdered binder material is deposited onto the upper surface of the woven roving 10. The powder binder is then carried into a heating station where it is heated to a softened and tacky state on the woven roving. A second web, which in the example is chopped strand mat 14, is fed from a coil 17 supported by mandrel 24. This second web is forced onto the tacky binder and web 10 at the end of the primary conveyor belt 16 by a press roll 26. A laminate 28, formed by the bonding of a layer of the woven roving 10 and a layer of chopped strand mat 14, is directed downwardly to a return conveyor belt 30 thereby inverting the laminate 28. A high velocity stream of cooling air in a cooling duct 32 is directed over the woven surface of the inverted laminate. From the cooling duct 32 the laminate 28 is directed to a winder 37 where it is wrapped in coil form on a rewind mandrel 38 with the woven roving 10 wound on the outside to protect the more fragile chopped strand mat 14.

The woven roving mandrel 12 is an idler mandrel from which the woven roving 10 must be pulled. Initially, the woven roving 10 is brought in contact with the moving primary conveyor belt 16 at the point of tangency between the top of the primary conveyor belt 16 and a feed roll 40. Only the weight of the feed roll 40 is brought to bear on the woven roving 10 to maintain the woven roving 10 against the primary conveyor belt 16 to thereby convey the woven roving 10 from right to left as illustrated in FIG. 1. An idler type pressure roll 42 is provided on the opposite side of the belt 16 directly opposing the feed roll 40 to establish the position of the primary conveyor belt 16 and prevent it from deflecting under the weight of the feeder roll 40.

Two air cylinders 46 (one illustrated) are coupled to the feed roll 40 to provide a means for retracting the roll 40 from the woven roving 10.

The conveyor belt 16 is supported by a pair of spaced apart rolls 50 and 52 which are rotatably mounted with frame 48. The roll 50 is driven, while the roll 52 is an idler roll. Since the conveyor belt 16 is a continuous loop, tension on the belt 16 can be established and maintained by moving the roll 52 in a direction away from the drive roll 50. Moving of the takeup roll 52 is accomplished by a pair of screw mechanisms 54 (one illustrated) attached to a pair of bearing takeup blocks 56 on either end of the roll 52. The tension on the primary conveyor belt 16 enhances the frictional contact of the belt 16 with the drive roll 50 and militates against the tendency of the belt to sag. Adjustment of the screw mechanisms 54 can be accomplished independently of each other to change the angle between the direction of the primary conveyor belt 16 and the longitudinal axis of the takeup roll 52 resulting in the ability to tract the belt 16 by controlling side movement thereof.

Sagging of the conveyor belt 16 is further militated against by the use of a series of spaced apart idler type conveyor rolls 58 rotatably mounted on the frame 48. Serving the same purpose on the return side of the primary conveyor belt is supported by a conveyor return roll 60 which is rotatably mounted to the frame 48.

Mounted on the frame 48 above the primary conveyor belt 16 and adjacent the feed roll 40 is a binder station 18 having a storage hopper 62 containing powdered binder which is metered from its bottom by a suitable metering mechanism, not illustrated. FIG. 2 illustrates the hopper 62 spanning the width of the primary conveyor belt to enable binder to be distributed over the entire width thereof. Also illustrated is a motor reducer drive 64 for the above metering mechanism.

Other means of furnishing binder to the woven roving could be employed, especially where the binder is a liquid, for example, a spray mechanism. An example of a product for use as the primary conveyor belt 16 would be a woven wire belt. Other belts, for example a link belt could be used as well as a series of belts across the face of the drive roll 50. Further, while the belts are preferably horizontal, other orientations are functional, e.g., the belts could be inclined to horizontal.

Next to the binder station 18 is a heater 72 of heater station 20. The heater 72 is illustrated in FIGS. 1 and 3 in the operative position immediately above the primary conveyor belt 16. Upon stoppage of the line, the heater 72 can be raised or otherwise removed to a more remote position from the primary conveyor belt 16 to prevent overheating of the woven roving and belt 16. Manual actuation of an air cylinder 74, illustrated in the deactivated position in FIG. 1, will move the heater through a cable and pulley system 76, illustrated in FIG. 3. Extension of the rod of the cylinder 74 causes the heater 72 to travel a fixed distance by pulling directly on the cable 78 from which the heater is suspended. Both the cylinder 74 and cable and pulley system 76 are mounted on the frame 19.

The heater 72 is of the radiation type using electrical elements, not illustrated, as a constant heat source for a radiant panel of refractory type material. Other alternatives for heating which could be used would include a gas fired refractory panel.

Spaced from the heater station 20, in the direction of travel of the woven roving, is the chopped strand mandrel 24. The mandrel 24 is rotatably mounted to supply chopped strand mat 14 to the press roll 26 from a wrapped coil of mat 14 supported on the mandrel 24. Press roll 26 is provided with bearing takeup blocks 80. With the press roll 26 mounted in takeup blocks 80, two air cylinders 81, one of which is illustrated in FIG. 1, attached to the mountings at each end of the press roll 26, maintain the roll 26 in contact with the chopped strand mat 14 to apply constant pressure to the chopped strand mat 14. The chopped strand mat is forced against the woven roving 10 as both pass between the press roll and the drive roll 50 of the primary conveyor belt 16 whereby the binder on the woven roving is forced into more intimate contact with the woven roving and chopped strand mat and its binder.

To align the chopped strand mat 14 with the woven roving 10 the chopped strand mat mandrel 24 has provisions for movement in the direction of its longitudinal axis. FIG. 3 illustrated the mandrel 24 supported by stub shafts 82 in bushing blocks 84 on frame 19. The stub shafts 82 are rotatable and slidable within the bushing blocks 84. A coupling 86 on a slide mounted base 88 supported by frame 19 longitudinally orients mandrel 24. Drive shaft 90 fixedly attached to the coupling 86 imparts motion to the coupling to position mandrel 24. A sprocket 92 having threads mating to threads of a lead screw (not shown) on drive shaft 90 is mounted between bushings 94 slidably supporting the drive shaft 90, and is driven by a reversible drive 96 on frame 19 through a chain 98 and sprocket 100 interconnecting the sprocket 92 and the reversible drive 96. Thus, by reversing the drive 96 the drive shaft 90 can be moved forward and backward to impart the same aligning motion to the chopped strand mandrel 24.

The woven roving 10 is inverted from its prior position on the primary conveyor belt 16 when it is turned about the drive roll 50. This places the woven roving atop the chopped strand mat 14 laminae and the chopped strand mat laminae on the surface of the return conveyor belt 30. Laminate 28 is pressed upon the return conveyor belt 30 following the press roll 26 by a hold down roll 102. The hold down roll 102 is an idler roll rotatably mounted to frame 48.

Return drive roll 104 drives the return conveyor belt 30. The return belt generally duplicates the primary conveyor in construction and function. The preferred embodiment of the return conveyor belt 30 illustrated in FIG. 1 includes a takeup roll 106 mounted in bearing takeup blocks 108 operable by screw mechanism 110 to adjust the tracking of the return conveyor belt 30 as well as apply tension thereto to prevent sag as described above for the primary conveyor belt 16. The return conveyor belt 30 provides support for return of the laminate 28 to the rewind mandrel 38 by direct contact with the chopped strand mat portion. In this manner, the more fragile chopped strand mat is protected by being sandwiched between the return conveyor belt 30 and the woven roving 10. The return conveyor belt in turn is supported over its span by a series of rotatably mounted conveyor rolls 112 contacting the surface of the belt 30 opposite the laminate 28 while a conveyor return roll 116 gives support to the returning portion of the return conveyor belt 30 to again decrease the amount of sag in the belt 30.

A cooling station 32 for removing sufficient heat from the laminate and binder to set the binder and permit the winding of the laminate into a coil is located in heat transfer relationship to the return conveyor 30. The cooling station 32 is in the form of a hood or shroud, which may be of sheet metal, arranged to direct a stream of cool air over the upper surface of return conveyor 30 and laminate 28. In order to minimize air losses at the apertures admitting the conveyor and laminate to the shroud, the upper margin of those apertures is formed with only a limited clearance above the conveyor borne laminate and is provided with a rolled lip 118 and 120 to present a non-snagging surface to the laminate.

Hold down roll 122 adjacent the exit for the cooling station maintains the laminate against return conveyor 30. The air stream flows at about 2,800 feet per minute transverse of the length of the laminate and return conveyor. Roll 122 maintains the laminate alignment on the conveyor and overcomes any tendency of the cooling air stream to shift the laminate 28. Positioning of the laminate by roll 122 is facilitated by the maintenance of the proper tension in the laminate downstream of the roll 122 as by the winder 37 of FIG. 1. Alternatively, the directional roll 130 of FIG. 5 tensions the laminate downstream of roll 122 where the laminate 28 is slit.

FIG. 2 illustrates the cooling station 32 spanning the return conveyor belt 30 and shows a portion of the exhaust vent 124, supply duct 126 and blower 128. A conventional motor and belt and pulley drive not illustrated, are used to drive the blower 128 which is mounted on the floor adjacent the cooling duct 32.

Alternative means for setting the binder and cooling the laminate 28 could be used, for example, the cooling duct 32 which acts as a plenum could be replaced with a series of nozzles blowing down on the return conveyor belt 30. Further, where other materials are used the binder may be set by means other than by cooling, for example, by heating in an oven.

Laminate 28 is completed when it exits the cooling station. It is wound into a coil on a rewind mandrel 38. Mandrel 38 is driven by a conventional drive 148 (best seen in FIG. 4) while it is supported at each end on frame 25 by paired rollers 152 and 154 and maintained thereon by hold down roller 156. A gate 157 is pivotally mounted on frame 25 to support hold down roller 156 so that it can be swung away from mandrel 38 to allow quick release of the mandrel for loading and unloading the rewind.

FIG. 4 illustrates a portion of the rewind mandrel 38 together with a manual clutch 142 and a drive shaft 144 attached thereto and driven by a variable speed motor reducer 146 through a chain and sprocket loop 148. The drive shaft 144 is rotatably mounted in bearings 150 affixed to the frame 25. The frame 25 also supports the variable speed motor reducer 146 which can accommodate the required change in speed of rotation of the rewind mandrel 38 upon buildup of the coil being wound to maintain the linear speed of travel of the laminated mat 28 through the apparatus.

Other means of collecting the laminate 28 could be used, for example, a pair of pinch rolls in combination with a shear could be used to form cut lengths of laminate 28.

FIG. 3 illustrates a variable speed drive 158 for the primary and return conveyor belts 16 and 30 which is similar to the rewind motor reducer 146 both of which are constant torque drives to maintain constant tension on the material being transferred. The motor and reducer 160 and 162 are interconnected by a belt drive 164 and drive the drive rolls 50 and 104 for the primary and return conveyor belts 16 and 30 respectively through chain and sprocket connections at 166. The drive 158 is fixedly mounted on the frame 48 and provides the required fine adjustment of linear speed of the woven roving 10, chopped strand mat 14 and laminate 28 in coordination with the quantity of heat released from the heater 72 to obtain the proper heating time for the materials being processed.

The illustrative apparatus has formed laminate at a throughput speed of 18 to 20 feet per minute from woven glass fiber roving of 24 ½ ounces per square yard, which is about one-sixteenth inch thick, and chopped glass fiber roving mat of 13 ½ ounces per square yard, which is about one sixteenth inch thick. In this process the granular propoxylated bisphenol A fumarate polyester resin is applied uniformly at a rate of about 0.3 ounces per square yard. The binder becomes tacky between 200° and 300° F and has the characteristic of heating faster than the woven glass fiber roving. Tackiness is maintained for adhesively bonding the chopped roving at a station twelve to fourteen inches from the exit of the heater zone 20. The laminate is cooled to about 100° F prior to winding it into a coil. It has been found that if a heat buildup is permitted in the coil, the laminate takes a set and tends to delaminate. Cooling station or plenum 32 has a height of 4 inches and a width of about 30 inches along the direction of travel of the laminate 28 and a length extending across the full width of the return conveyor 30, and when supplied with ambient air as the cooling medium, flowing at feet per minute cools the product adequately for winding. Cooling station 32 is 5 to 6 feet downstream from the press roll 26 at which the webs 10 and 14 are adhesively engaged. Various parameter combinations can be employed depending upon the desired throughput, the materials of the lamina and the binder.

FIG. 5 illustrates an embodiment for feeding woven roving 10 onto the primary conveyor belt 16 without the use of a feed roll 40 (illustrated in FIG. 1). The coil 27 of woven roving is driven in this arrangement. A series of rollers 168 are rotatably mounted on a pivotal arm 170 which is swingable to engage the rollers 168 with the outer periphery of the coil 27 of wrapped woven roving 10 on the mandrel 12. The pivotal arm is attached to the frame 13 by a shaft 172 mounted thereon with two pillow block bearings 174 (one illustrated). To drive the rollers 168 at belt speed, a chain and sprocket loop 176 interconnects a shaft 178 of takeup roll 52 with the shaft 172, which is journaled to the pivotal arm 170, and another chain and sprocket loop 180 interconnects the shaft 172 with axle 182 which is pivotally mounted to the pivotal arm 170 and to which the rollers 168 are fixedly attached. An air cylinder 184 is pivotally attached to the pivotal arm 170 intermediate of the shaft 172 and axle 182 and similarly pivotally attached to the frame 48 at 186. Since the rollers 168 contact the woven roving 10, their composition is of a soft rubber, but other materials having similar non-abrasive characteristics combines with a high coefficient of friction could be used.

The weight of the pivotal arm 170 and rollers 168 alone maintains the rollers 168 in contact with the periphery of the coil of woven ring 10 as the diameter thereof is continually reduced upon unwrapping the woven roving 10. With the speed of the rollers 168 established at belt speed, the rate of travel between the woven ring 10 approaching the primary conveyor belt 16 and the rate of travel of the belt 16 are the same even though the rotational speed of the coil of woven roving varies. Thus, the woven roving 10 is fed onto the primary conveyor belt 16 at the speed of the belt 16 thereby eliminating any buildup of woven roving 10 and the requirement of pulling on the woven roving 10. With the tension requirement on the woven roving eliminated, the drive illustrated in FIG. 5 is especially suitable for loosely woven material which has characteristics making it susceptible to distortion under tension. When a new coil of woven roving 10 is to be placed on the mandrel 12, the cylinder 184 provides a convenient means for swinging the rollers 168 out of the way.

Also shown in FIG. 5 is a slitter for slitting the laminate as it leaves the cooling station 32 and return conveyor 30. After the laminate 28 leaves the return conveyor belt 30, it is directed around a directional roll 130 to provide a 90° wrap around a guide roll 132 which controls the tracking of the laminate 28 into a slitter station 36. Edge sensors 134 and associated guide equipment of the edge guide station 34 sense the position of the laminate 28 and send corrective signals to the guide roll 132 to adjust the position of the laminate 28. The slitter station 36 divides the laminate 28 longitudinally thereby forming two widths of laminate. The major components of the slitter 36 include a circular knife blade 136 and associated driven platen roll 138 between which the laminate 28 is passed in the slitting process. Examples of edge guide and slitter station 34 and 36 equipment would be a Center Guiding System manufactured by Fife and a No. 26 Slitting Unit manufactured by Cameron Machine Company. Other types and manufacture of guiding and slitting equipment could be used.

A final directional roll 140 is used to obtain the required wrap about the platen roll 138 of the slitter station 36 before the laminate 28 is wound into a coil on the rewind mandrel 38.

To operate the apparatus of the preferred embodiment, coils of woven roving 10 and chopped strand mat 14 must be furnished and properly in place on mandrels 12 and 24 respectively. With the speed of the primary conveyor belt 16 adjusted to give the proper heating time within the heater station 20, woven roving is supplied to the primary conveyor belt 16 and advanced thereby past the binder station 18. A uniform coat of binder is applied to one major surface of the woven roving 10 at the binder station 18. Having been coated with binder, the woven roving is further advanced to a heater station 20 where the binder is activated to a tacky state by being heated upon the woven roving 10. Subsequent to being heated, the woven roving surface having the tacky binder on it is again advanced to the press roll 26 where the tacky surface is mated with a chopped strand mat 14 causing the two layers to fixedly contact each other. The chopped strand mat 14 is furnished to the press roll in alignment with the woven roving so that the longitudinal edges thereof oppose the longitudinal edges of the woven roving 10. Upon passing between the press roll 26 and primary conveyor belt 16, the chopped strand mat 14 and woven roving 10 are pressed together with the binder between them by pressure applied by the press roll 26 pinning the layers momentarily between the press roll 26 and the drive roll 50. Having been joined, the chopped strand mat 14 and the woven roving 10 form a laminate 28 which advances to a return conveyor belt 30 by turning the woven roving 10 generally 180° about the drive roll 50 thereby inverting the woven roving portion of the laminated mat 28 to place it facing away from the return conveyor belt 30. Support for the laminate 28 is provided by contact of the return conveyor belt 30 with the chopped strand portion thereof with a hold down roll 102 assuring that the contact is made immediately upon leaving the press roll. Cooling of the exposed woven roving 10 surface occurs by natural convection and radiation as it is advanced to the cooling duct 32 where final cooling is accomplished by forced convection using cooling air directed to the surface of the woven ring 10 by the cooling duct 32.

The laminate 28 is now in condition to be coiled for shipment, but if it is desirable, it can be further processed by dividing the width of the laminate 28 by further advancing the laminate 28 past an edge guide station 34 which centers the mat 28 within a slitter station where the mat 28 is slit into two portions before being coiled on the rewind mandrel 38.

While the above operation has been described with respect to the preferred embodiment illustrated in the drawings, it is to be understood that the method of joining two or more layers could be practiced other than on the apparatus illustrated, and could even be performed manually with the exception of means for joining the layers under pressure.

The present apparatus provides a way of joining layers of material, and in particular woven roving 10 and chopped strand mat 14, which are subject to wear and distortion under excessive handling and tension. The above materials are combined under a minimum amount of constant and controlled tension while generally being continually supported to militate against dimensional distortion. Distortion is also prevented by prompt and efficient cooling of the laminated layers.

The product of a laminate 28 formed of a woven roving 10 and chopped strand mat 14 is useful in the production of glass reinforced molded resin panels and bodies wherein its use can reduce the time required to produce a mold of multiple layers by generally up to fifty percent.

Further, the product of a laminate 28 has greater stability against deterioration because of the addition of a bond between the layers over that of either of the individual layers. The additional stability is especially noticeable when the laminate of woven roving and chopped strand mat is slit and the bond therebetween helps to retain the slit edge of the woven roving from unravelling.

It is to be understood that the above disclosure is illustrative of the invention and that the invention may be practiced otherwise than as specifically illustrated and described without departing from its spirit or scope.

I claim:

1. A process for forming a laminated structure of a relatively rugged woven roving mat and a relatively fragile adhesively bonded chopped strand mat which maintains the dimensional stability of the chopped strand mat and prevents attrition of individual strands from the chopped strand mat during lamination of the mats comprising:

a. advancing the woven roving mat with a heat activated adhesive on a major surface thereof along a first path,
b. advancing the adhesively bonded chopped strand mat along a second path which intersects with said first path,
c. heating the adhesive on the major surface of the woven roving mat,
d. effecting contact between a major surface of the adhesively bonded chopped strand mat and the major surface of the woven roving mat with the heated adhesive; and
e. supporting the adhesively bonded chopped strand mat on a supporting means which advances the mats, with the woven roving mat overlaying the adhesively bonded chopped strand mat, until the heated adhesive including any adhesive of the chopped strand mat which has been heated by heat transfer from the woven roving mat is cooled enough to solidify so that the mats are bonded together and the adhesively bonded chopped strand mat maintains its integrity.

2. A process according to claim 1 wherein the heat activated adhesive on the major surface of the woven roving mat is applied in a dry, powder-like, nontacky form to the major face of the woven roving mat.

3. A process according to claim 2 wherein the adhesively bonded chopped strand mat and the woven roving mat are pressed together as the contact between the mats is effected.

4. A process according to claim 3, wherein a stream of cooling gas is passed over the mats to solidify the adhesive.

5. An apparatus for forming a laminated structure of a relatively rugged woven roving mat and a relatively fragile adhesively bonded chopped strand mat which maintains the dimensional stability of the chopped strand mat and prevents attrition of individual strands from the chopped strand mat during lamination of the mats comprising:
a. means for applying a heat activated adhesive onto a major surface of a woven roving mat in a dry powder-like, non-tacky form,
b. means for advancing the woven roving mat with the heat activated adhesive on the major surface thereof along a first path,
c. means for advancing an adhesively bonded chopped strand mat along a second path which intersects with said first path,
d. means for heating the adhesive on the major surface of the woven roving mat,
e. means for effecting contact between a major surface of the adhesively bonded chopped strand mat and the major surface of the woven roving mat with the heated adhesive,
f. means for pressing the chopped strand mat and the woven roving mat together as the contact between the mats is effected,
g. means for passing a stream of cooling gas over the mats to solidify the adhesive, and
h. endless conveyor means for supporting and advancing the mats as the mats are being cooled by the cooling gas, with the woven roving mat overlaying the adhesively bonded chopped strand mat until the heated adhesive, including any adhesive of the chopped strand mat which has been heated by heat transfer from the woven roving mat, is cooled enough to solidify so that the mats are bonded together and the adhesively bonded chopped strand mat maintains its integrity.

* * * * *